June 23, 1953 L. D. HAGENBOOK 2,642,971
OVERLOAD RELEASED FLUID CLUTCH
Filed Nov. 12, 1947 4 Sheets-Sheet 4
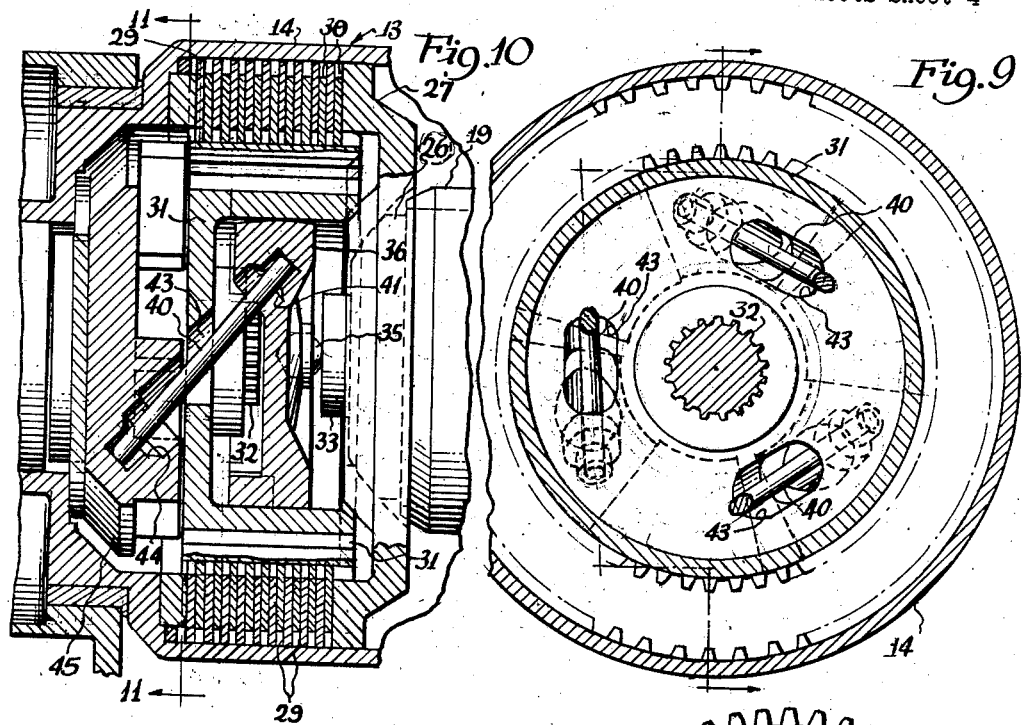
INVENTOR.
Loy D. Hagenbook
BY
Clarence F. Poole
ATTORNEY Patented June 23, 1953

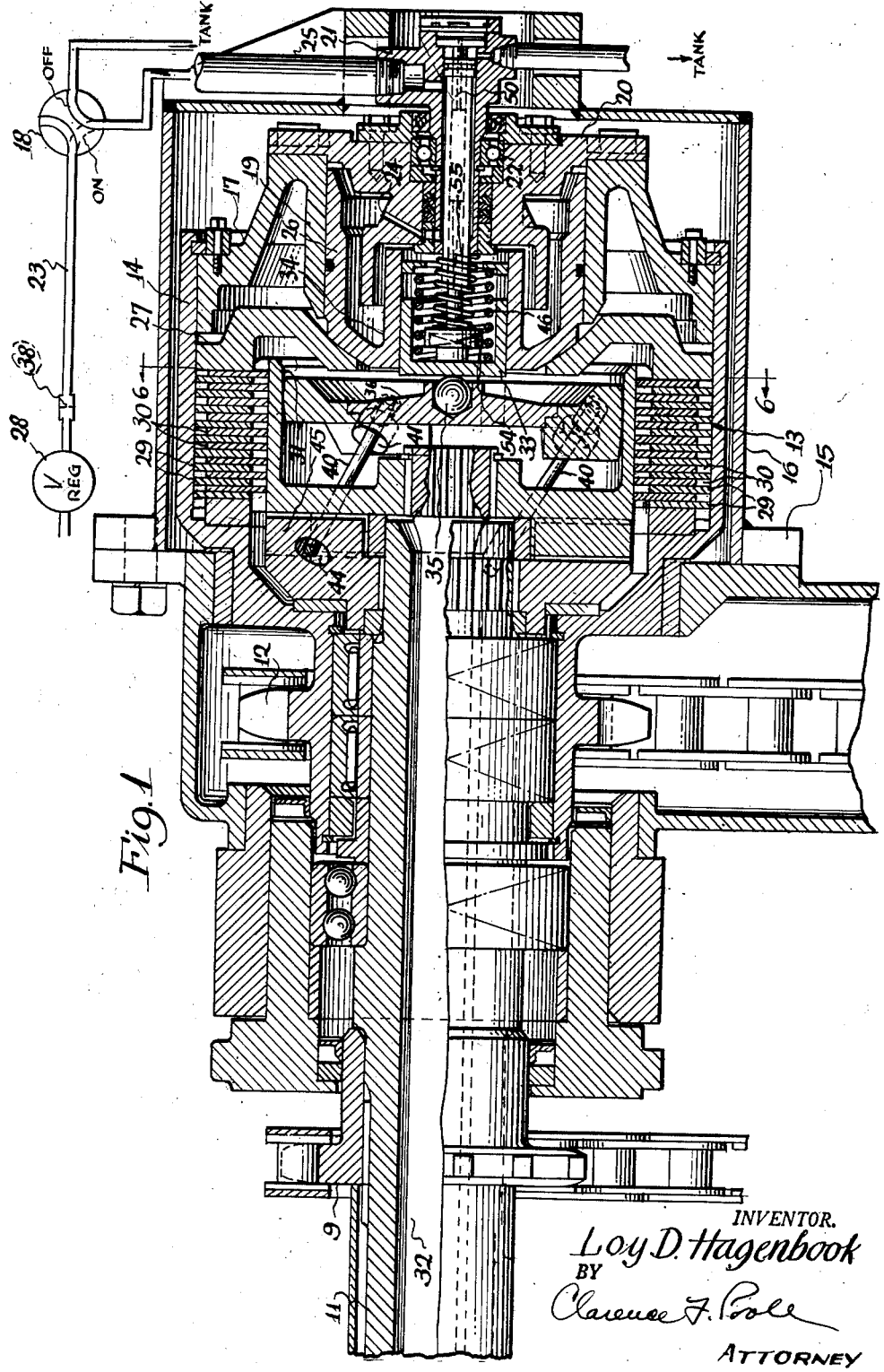

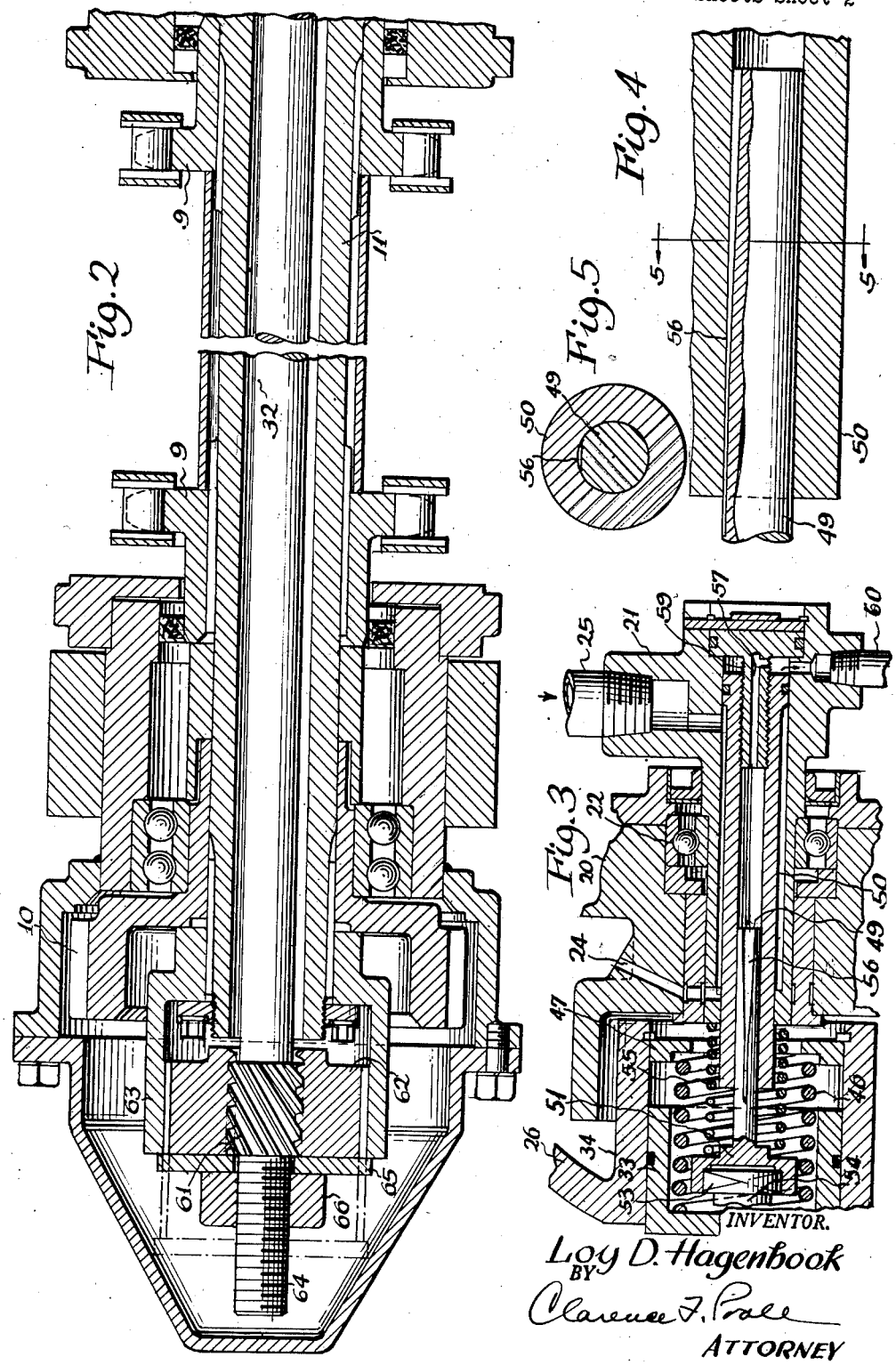

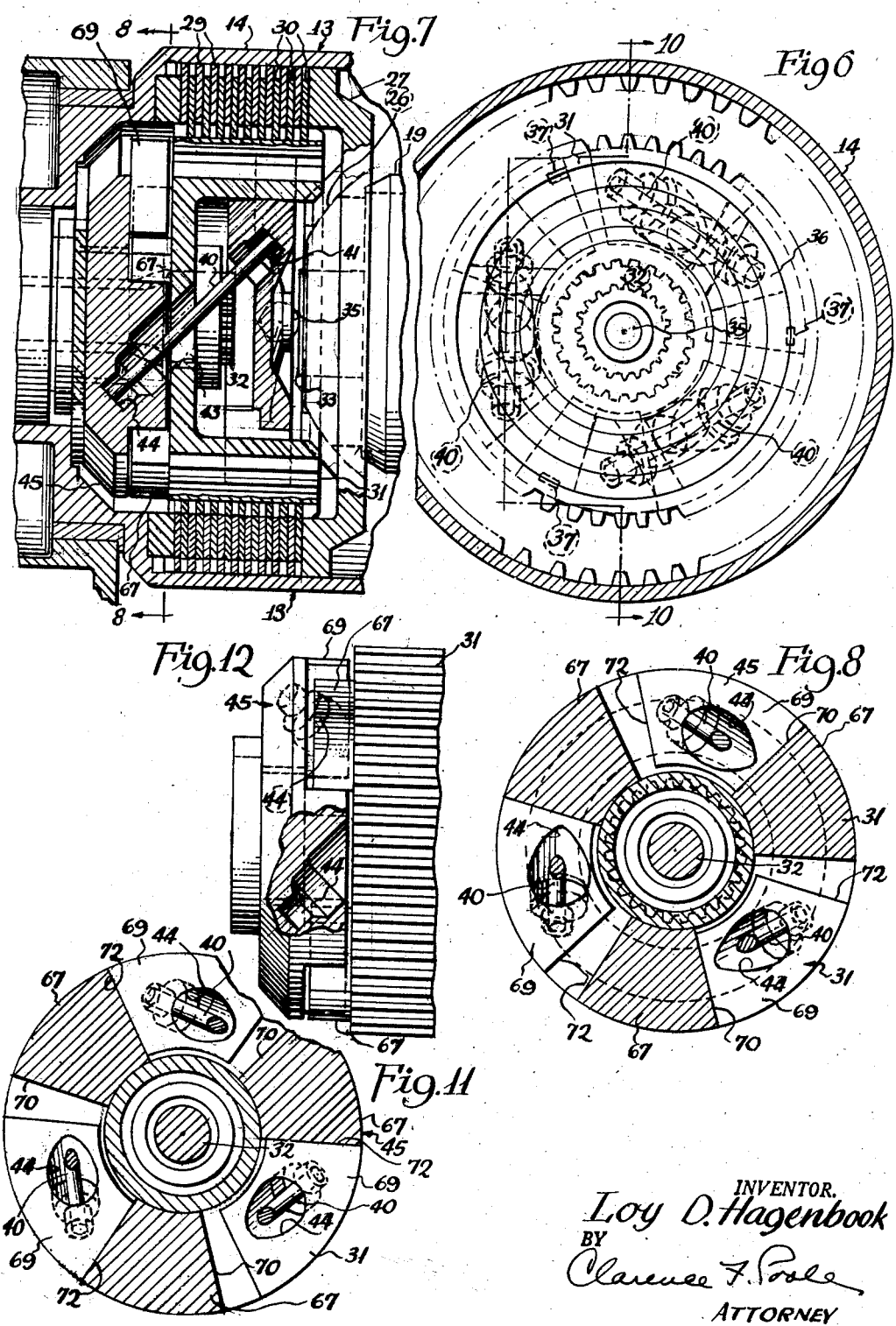

2,642,971

UNITED STATES PATENT OFFICE 2,642,971

OVERLOAD RELEASED FLUID CLUTCH

Loy D. Hagenbook, Chicago, Ill., assignor to Goodman Manufacturing Company, Chicago, Ill., a corporation of Illinois Application November 12, 1947, Serial No. 785,288

13 Claims. (Cl. 192—56)

This invention relates to improvements in clutches, and more particularly relates to a new and improved form of torsion overload friction slip clutch.

The principal object of my invention is to provide an efficient, simple, novel and compact form of self-adjusting torsion overload friction slip clutch releasable by relative angular movement of two rotating parts with respect to each other, one of which parts is a torsion member and serves to drive the other.

Another object of my invention is to provide a novel form of torsion overload friction slip clutch including a releasable friction clutch for driving a driven member from a driving member with torsion means for measuring the transmitted torque and providing movement to operate fluid pressure means when a predetermined torque is exceeded, to decrease the torque capacity of the clutch to a value equal to the predetermined torque, so as to allow the clutch to slip at this torque load.

A further object of my invention is to provide a new and improved form of torsion overload type of friction slip clutch having a fluid pressure cylinder and piston to engage the clutch and hold it in an engaged position, and having a torsion member driven from the clutch, which serves as a driving member for the parts driven by the clutch, and utilizing a release piston extensible from the engaging piston upon a predetermined angular movement of the torsion member caused by overload on the clutch, to increase the volume of the engaging cylinder and decrease pressure on the engaging piston, to permit the clutch to slip.

A still further object of my invention is to provide a fluid operated torsion overload friction slip clutch of a type using a fluid cylinder and piston for engaging the clutch, and having a release piston extensible from the engaging piston with an engaging member for holding the release piston in a retracted position with respect to the engaging piston upon normal operation of the clutch, and movable by relative angular movement of two rotating parts of the clutch, to permit extension of the release piston upon overload, together with a metering valve so constructed and arranged as to operate upon extension of the release piston and give a pressure on said release piston substantially equal to the pressure exerted thereon by the engaging member, as said release piston follows said engaging member, so as to prevent hunting of the clutch and to permit the clutch to slip with a minimum amount of release motion.

These and other objects of my invention will appear from time to time as the following specification proceeds and with reference to the accompanying drawings wherein:

Figure 1 is a view in side elevation of one end of an overload friction slip clutch constructed in accordance with my invention, with certain parts broken away and certain other parts shown in substantially longitudinal section;

Figure 2 is a view somewhat similar to Figure 1 but showing the opposite end of the clutch from that shown in Figure 1 and forming a continuation of Figure 1;

Figure 3 is an enlarged detail fragmentary longitudinal sectional view showing certain details of the release piston and the valve means operated thereby for releasing fluid therefrom upon extensible movement of said release piston from the operating piston for the clutch;

Figure 4 is an enlarged fragmentary detail partial longitudinal sectional view showing certain details of the metering valve which is operable with the release piston, for reducing fluid pressure in the cylinder, upon overload of the clutch;

Figure 5 is a transverse sectional view taken substantially along line 5—5 of Figure 4;

Figure 6 is an enlarged transverse sectional view taken substantially along line 6—6 of Figure 1 and showing the clutch in an engaged position;

Figure 7 is a sectional view taken substantially along line 7—7 of Figure 6;

Figure 8 is a fragmentary sectional view taken substantially along line 8—8 of Figure 7 and showing the positions of the relatively rotatable parts of the clutch with respect to each other when the clutch is in an engaged position;

Figure 9 is a transverse sectional view showing the positions of certain operative parts of the clutch when in a slipping position;

Figure 10 is a longitudinal sectional view somewhat similar to Figure 7, taken along the line 10—10 of Figure 9, and showing the clutch in a slipping position;

Figure 11 is a fragmentary transverse sectional view taken substantially along line 11—11 of Figure 10 and showing the positions of the relatively rotatable parts of the clutch with respect to each other when in a slipping position;

Figure 12 is an enlarged detail view with certain parts broken away and shown in section in order to show certain details of certain of the relatively rotatable parts of the clutch;

Figure 13 is a detail view of one of the relatively rotatable parts of the clutch;

Figure 14 is a view showing another of the relatively rotatable parts of the clutch in end and side elevations; and Figure 15 is a fragmentary detail longitudinal sectional view showing certain details of the drive connection between one of the relatively rotatable parts of the clutch and the member which engages the release piston.

The embodiment of my invention illustrated in the drawings is shown as being incorporated in the drive to a pair of sprockets 9, 9 and a spur gear 10, keyed on a hollow shaft 11, for driving the conveyor and gathering elements of a coal loading machine, such as is illustrated in the Cartlidge Patent No. 2,201,334, and no part of my present invention, so not herein shown or described. A coaxial drive sprocket 12 journaled on said hollow shaft serves to drive said sprockets 9, 9 and gear 10 through a friction clutch indicated generally by reference character 13, and herein shown as being of a friction disc type, although it may be of any other well known form of friction clutch. The drive sprocket 12 is herein shown as being formed integrally with the hub of an internally splined clutch housing 14, rotatably supported adjacent said drive sprocket in a frame member 15, and projecting outwardly therefrom. A casing 16 secured to said frame member and projecting outwardly therefrom, serves to enclose said clutch housing.

The end of the clutch housing 14 opposite from the drive sprocket 12 is closed by a closure member 17 having an inwardly extending cylinder 19 formed integrally therewith and coaxial with the axis of rotation of said housing. A member 20 is secured to the head end of said cylinder and extends inwardly thereof. Said member 20 is journaled on an inwardly extending hollow conduit 21 on a ball bearing 22. Said conduit is suitably held from rotation and extends inwardly along said member 20 and forms a passageway for fluid, to supply fluid to a passageway 24 formed in said member 20 and leading to the inside of the cylinder 19. A pressure pipe 25 is connected with the outside of said conduit for supplying fluid under pressure thereto, and for dumping fluid therefrom. A clutch engaging piston 26 is slidably mounted within said cylinder and has engagement with an engaging member 27, for moving said engaging member in a direction to engage alternate discs 29 and 30 of the clutch with each other. As herein shown, the discs 29, 29 are splined on the inside of the clutch housing 14 while the discs 30, 30 are interposed between said discs 29, 29 and are splined on the outside of a driving member 31. Said driving member is splined on the inner end of a torsion bar 32, which serves to drive the hollow shaft 11 and also serves to measure the transmitted torque and to provide the movement necessary to operate fluid pressure means, to decrease the torque capacity of the clutch, when a predetermined torque is exceeded, so as to allow the clutch to slip, as will hereinafter more clearly appear as this specification proceeds.

A control valve 18 of any well known form may be provided to connect the pipe 25 to the supply of fluid under pressure from a pressure line 23, to supply fluid under pressure to the cylinder 19 and piston 26, to engage the clutch, to drive the sprockets 9 and gear 10 (see Figure 1). The pressure line 23 is connected with a source of fluid under pressure such as an accumulator or pump (not shown), and has a pressure regulating valve 28 of any well known form connected therein in advance of said valve 18. From said pressure regulating valve, fluid under pressure passes through a fixed orifice indicated by reference character 38 and then to the control valve 18. Said pressure regulating valve and orifice are provided to supply fluid to the cylinder 19 at a predetermined pressure and to cause a drop in pressure when the fluid pressure means for permitting the clutch to slip comes into operation, to increase the volume of the cylinder 19 and at the same time release fluid therefrom at a predetermined rate. Said control valve 18 may also be moved into a position to connect the pipe 25 to the return and to the storage tank for the fluid system (no shown), to dump fluid from the cylinder 19, when it is desired to release the clutch under control of the operator.

The fluid pressure means which permits the clutch to slip upon overload includes a release piston 33 mounted in a cylindrical central portion 34 of the engaging piston 26, for extensible movement therefrom, to increase the volume of the cylinder 19 as said release piston is extended from said engaging piston and to reduce the pressure exerted against said engaging piston, and permit the clutch to slip. Said release piston engages a ball 35 at its outer end, which is mounted in a socket formed in the center of a rectilinearly movable engaging member 36. Said engaging member is feathered within the driving member 31 on feather keys 37, 37, see Figure 15, so as to rotate with said driving member and move along said driving member in the direction of the axis of rotation thereof. Said engaging member is engaged with said release piston by means of a plurality of angle pins 40, 40, angularly disposed with respect to the face of said engaging member and pivotally engaging angular sockets 41, 41 formed in said engaging member and extending through apertures 43, 43 formed in the driving member 31. The opposite ends of said angle pins pivotally engage sockets 44, 44 formed in a reaction member 45 for the torsion bar 42. Said reaction member is keyed on the inner end of the hollow shaft 11.

The tendency of the torsion bar 32 to unwind from its preloaded position in the direction of rotation of the hollow shaft 11 will hold a stop 67 on the member 31 against a stop 69 on the member 45 (see Figure 8). This will hold the angle pins 40, 40 in the correct angular position to hold the engaging member 36 and ball 35 in engagement with the end of the release piston 33, and will hold said release piston in a retracted position with respect to the piston 26. When, however, predetermined overload conditions occur, said torsion bar will wind with respect to said hollow shaft in a direction opposite its direction of rotation. This will permit the reaction member 45 to move angularly with respect to the driving member 31 and the engaging member 36 in a direction to flatten the angle of said angle pins 40, 40 with respect to the faces of said members 36 and 45 (see Figure 10). Said engaging member 36 will then move towards said reaction member 45 and pressure on said release piston will extend said release piston from the piston 26 and cause said release piston to follow said engaging member and increase the volume of the cylinder 19 and reduce the pressure acting on said piston 26, permitting the clutch to slip.

A compression spring 46 is mounted within the release piston 33 and is interposed between the inner end of the head of said piston and an annular retaining ring 47, secured to the inside of the central cylindrical portion 34 of the engaging piston 26, to tend to extend said release piston from said engaging piston 26 at all times.

A metering valve operable by extensible movement of the release piston 33 from the engaging piston 26 is provided to release fluid from the cylinder 19 and to permit the circulation of fluid through said cylinder at all times. Said metering valve is so calibrated that the pressure exerted on said release piston by the spring 46 and fluid under pressure within the cylinder 19 will be substantially the same as the pressure exerted in an opposite direction by the engaging member 36 (see Figure 3). Said valve operates in conjunction with the pressure regulating valve 28 and the fixed orifice 38, and is herein shown as including a metering pin 49 slidably movable within a sleeve 50. Said sleeve extends within the conduit 21 beyond the inner end thereof into the cylindrical portion of the piston 26 and is threaded at its outer end in a threaded member 59, suitably secured to the outer end of said conduit and closing the outer end thereof. Said member has a fluid passageway 57 extending therethrough and leading to a discharge pipe 60 threaded in and extending from said conduit, to discharge fluid passing through said metering valve. Said sleeve is spaced from the inner walls of said conduit, to permit fluid to pass from the pipe 25 through the passageway 24, and suitable packing is provided to prevent fluid from flowing from either end of said conduit, and from the pipe 25 through the discharge pipe 60, except fluid which may flow past said metering valve.

The metering pin 49 has an enlarged outer end 51 having an inwardly extending annular portion, which is mounted on a ball bearing 53. Said ball bearing is mounted on a stem 54 extending from the inside of the head end of the release piston 33 (see Figure 1). A compression spring 55 is interposed between the inner end of said pressure fitting 21 and the enlarged outer end 51 of said metering pin, to urge said metering pin in a direction to extend from said sleeve and to follow the release piston 33, as it is extended from the cylindrical portion 34 of the piston 26.

The metering pin 49 has a flattened portion indicated by reference character 56 and herein shown as initially being of a uniform width and depth adjacent the enlarged portion 51 of said pin, and as leading to the apex of an elongated V-shaped portion extending to the outer end of said metering pin (see Figures 3, 4 and 5). Said uniformly flattened portion of said metering pin is provided to permit the constant circulation of fluid through the cylinder 19 when the clutch is engaged, to cool the clutch and to prevent overheating of the fluid. Said V-shaped flattened portion of said metering pin gradually increases in width and depth as it extends to the outer end of said metering pin, and is so formed as to increase the volume of fluid flowing through said metering valve as the release piston 33 is extended from the engaging piston 26.

In setting the clutch for sensitive operation, the sleeve 50 is moved inwardly along the member 59 until the pressure reading on a gauge (not shown) in the pressure circuit for the clutch reaches a maximum. The metering valve when properly set is so calibrated that the pressure exerted on the release piston 33 will gradually decrease as said piston and the metering pin 49 are extended from the piston 26 and sleeve 50, so the pressure of the fluid on said release piston will be substantially equal to the pressure exerted against said piston in an opposite direction by the engaging member 36. The pressure regulating valve 28 and fixed orifice 38 acting in conjunction with said metering valve thus change the pressure of fluid in the clutch cylinder 19, when the flow of fluid is changed by operation of said metering valve. This provides an accurate regulation of pressure in the cylinder 19 and prevents hunting of the clutch and permits it to slip with a minimum amount of motion or twist on the torsion bar 32.

The torsion bar 32 extends through the hollow shaft 11 beyond the outer end thereof, and while a bar is herein shown as forming the spring or torsion member of the clutch of my invention, it should be understood that a coiled torsion spring or any other form of torsion member could be used in place of said bar. Said torsion bar may be made from a tempered spring steel of a regular contour throughout its length, so as to assure that there will be no irregularities in the strains on said bar and the forces exerted thereby, as it is wound. The hollow shaft 11 and sprockets 9, 9 may be rotatable in one direction while the torsion bar 32 may be wound in an opposite direction, so as to tend to exert a twisting or turning action on said hollow shaft in the direction of rotation of said shaft, and to yield in an opposite direction upon overload of said shaft. As shown in the drawings, said hollow shaft is rotatable in a counterclockwise direction and said torsion bar is wound in a clockwise direction. Helical teeth 61 in the form of a flat helix are formed on said torsion bar, adjacent its outer end (see Figure 2). Said teeth are adapted to be engaged by corresponding internal helical teeth formed in a winding member 62 externally splined within a housing 63. Said housing is keyed on the end of the hollow shaft 11 and extends outwardly therefrom, and serves to drive said shaft from said torsion bar. Said torsion bar also has a threaded end 64 extending outwardly beyond said helical teeth. A washer 65 is slidably mounted on said threaded end of said torsion bar. A nut 66 threaded on said threaded end of said torsion bar engages said washer with said winding member, and serves to move said winding member inwardly along the housing 63 and cause said winding member to wind said torsion bar to its preloaded position.

The end of the torsion bar 32 opposite from the winding member 62 is held from turning movement with respect to the hollow shaft 11, during winding of said torsion bar, by means of the stops 67, 67 on the driving member 31. Said stops extend from the driving member 31 towards the reaction member 45 and are adapted to engage the stops 69, 69 extending from said reaction member 45, when winding up said torsion bar (see Figures 7, 8 and 12).

When it is desired to wind up the torsion bar 32 to its preloaded position, to measure the transmitted torque of the clutch, said bar is first turned in a clockwise direction until faces 70, 70 of the stops 67, 67 engage the stops 69, 69. This will hold the inner end of said torsion bar from twisting movement with respect to the hollow shaft 11. The winding member 62 is then positioned so as to engage the internal splines of the housing 63 and the helical teeth on said torsion bar. The nut 66 is then turned to move said winding member inwardly from the position shown by broken lines in Figure 2 to the position shown by solid lines in said figure, and twist said torsion bar in a clockwise direction a predetermined amount, in an obvious manner. The amount of twisting of said torsion bar measures the desired torque to be transmitted and is determined by the load conditions and amount of movement of the release piston necessary to allow said clutch to slip.

When the hollow shaft 11 is overloaded the torsion bar 32 will twist in a direction opposite to its direction of rotation and the stops 69, 69 of the reaction member 45 will move away from the faces 70, 70 of the stops 67, 67 of the member 31 until faces 72, 72 of the stops 69, 69 engage the stops 67, 67. When turning in this direction said stops 67 and 69 serve to limit the twisting of said torsion bar beyond a predetermined amount. When the faces 72 of the stops 69 are in engagement with the stops 67, 67 of the member 31, the angles of the angle pins 40, 40 with respect to the members 45 and 36 will flatten and permit the engaging member 36 to move along the driving member 31 in a direction away from the engaging piston 26. The release piston 33, following said engaging member, will increase the volume of the cylinder 19 and reduce the pressure against the engaging piston 26 and will permit the clutch to slip. At the same time fluid will be released from said cylinder through the metering valve formed by the metering pin 49, which gives a pressure against said release piston substantially equal to the pressure exerted thereagainst by said engaging member 36, so as to prevent hunting of the clutch and permit the clutch to release with a minimum amount of twisting movement of the torsion bar 32.

It may be seen from the foregoing that a novel and improved form of self-adjusting fluid operated friction slip clutch has been provided which is so constructed and arranged that slipping of the clutch upon overload is attained by the use of a torsion member to measure the transmitted torque and provide the movement necessary to permit extending of the release piston 33 from the engaging piston 26, to increase the volume of the cylinder 19 and decrease the pressure therein, when a predetermined torque is exceeded, so as to allow the clutch to slip.

It may also be seen that the clutch of my invention includes a novel form and arrangement of metering valve formed by the metering pin 49, to permit a constant circulation of fluid through the clutch cylinder when the clutch is engaged, so as to prevent the clutch from overheating; and that this metering valve opens upon extension of the release piston and acts in conjunction with the pressure regulating valve 28 and fixed orifice 38, to change the pressure in the clutch cylinder as the flow of fluid changes. It may further be seen that said metering valve is so calibrated as to maintain substantially the same pressure on said release piston as is exerted thereagainst by the engaging member 36, so as to prevent sudden surges in pressure on the piston 26; and that said metering valve, pressure regulating valve, and fixed orifice, together with said engaging and release pistons, provide a clutch which is continually self-adjusting for expansion due to heat, and for wear, and which is free from hunting and allows the clutch to slip on overload with a minimum amount of angular movement of the torsion member 32.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a clutch for transmitting power, a driving member, a driven member, a releasable friction clutch for driving said driven member from said driving member, a fluid pressure operated engaging piston for moving said clutch into engagement, and release piston mounted within said engaging piston and subjected to fluid pressure operating said engaging piston and operatively connected with said driven member so as to move outwardly from said engaging piston upon predetermined load conditions on said driven member, to reduce the pressure of fluid acting against said engaging piston, whereby said clutch will slip upon predetermined load conditions.

2. In a clutch for transmitting power, a driving member, a driven member, a releasable friction clutch for driving said driven member from said driving member, a cylinder having a fluid pressure operated engaging piston for engaging said clutch, and a release piston mounted within said cylinder for communication with the pressure chamber of the engaging piston and operatively connected with said driven member so as to move with respect to and outwardly from said pressure chamber upon predetermined load conditions on said driven member, to reduce the pressure of fluid acting against said engaging piston, and a valve movable with said release piston, to reduce fluid pressure acting upon said engaging piston upon expansible movement of said release piston with respect to said pressure chamber, whereby said clutch will slip upon predetermined load conditions.

3. In a clutch for transmitting power, a driving member, a driven member, a releasable friction clutch for driving said driven member from said driving member, a fluid cylinder having a clutch engaging piston therein, a passageway for admitting fluid under pressure to said cylinder, to move said piston in a direction to engage said clutch, and a release piston mounted within said cylinder having communication with the pressure end of said cylinder and movable with respect to and outwardly therefrom upon overload of said clutch, to reduce the pressure of the fluid acting against said clutch engaging piston, whereby said clutch will slip upon predetermined load conditions.

4. In a clutch for transmitting power, a driving member, a driven member, a releasable friction clutch for driving said driven member from said driving member, a fluid cylinder having a clutch engaging piston therein, a passageway for admitting fluid under pressure to said cylinder, to move said piston in a direction to engage said clutch, a release piston mounted within said engaging piston and movable with respect to and outwardly therefrom upon overload of said clutch, to reduce the pressure of fluid acting against said clutch engaging piston, and a valve movable with said release piston, to release fluid from said cylinder upon extension of said release piston with respect to said engaging piston, whereby said clutch will slip upon predetermined load conditions.

5. In a clutch for transmitting power, a driving member, a driven member, a releasable friction clutch for driving said driven member from said driving member, a fluid cylinder having a clutch engaging piston therein, a passageway for admitting fluid under pressure to said cylinder to move said piston in a direction to engage said clutch, a release piston mounted within said engaging piston, said release piston being movable with respect to said engaging piston, a torsion member for driving said driven member from said clutch, an operative connection between said driven member and said torsion member and said release piston for holding said release piston in a retracted position with respect to said engaging piston during normal operation of said clutch and providing for extension of said release piston with respect to said engaging piston upon predetermined loads on said torsion member, and a valve movable with said release piston so constructed and arranged as to release pressure fluid acting upon said clutch-engaging piston upon extension of said release piston with respect to said clutch-engaging piston.

6. In a clutch for transmitting power, a driving member, a driven member, a releasable friction clutch for driving said driven member from said driving member, a fluid cylinder having a clutch engaging piston therein, a passageway for admitting fluid under pressure to the pressure chamber of said cylinder to move said piston in a direction to engage said clutch, a release piston mounted within said engaging piston, said release piston being adapted to move with respect to said clutch-engaging piston, said release piston communicating with the pressure chamber of the engaging piston, a torsion member for driving said driven member from said clutch, and a plurality of angle pins connected between said torsion member and said driven member and reacting against said release piston, to hold said release piston in a retracted position with respect to said engaging piston when said driven member and torsion member move together and to release said release piston for extensible movement with respect to said engaging piston and permit said clutch to slip, upon relative movement of said torsion member with respect to said driven member caused by yielding of said torsion member due to overload conditions on said driven member.

7. In an overload clutch for transmitting power, a friction clutch, a fluid cylinder, a passageway for admitting fluid under pressure to said cylinder, a clutch engaging piston in said cylinder and adapted to engage said clutch upon the admission of fluid under pressure thereto, a torsion member, a driving member for driving said torsion member from said clutch, a driven member driven by said torsion member, an engaging member rotatable with said torsion member and mounted for rectilinear movement in the direction of the axis of rotation of said torsion member, a plurality of angularly disposed angle pins interposed between said driven member and said engaging member for holding said two members in a predetermined spaced relation with respect to each other and permitting one member to move towards the other upon relative movement between said driven member and said torsion member effected by twisting movement of said torsion member with respect to said driven member caused by overload of said driven member, and a release piston engaged by said engaging member and extensible with respect to said cylinder, said release piston communicating with the pressure chamber of the engaging piston, for reducing the pressure on said engaging piston upon movement of said engaging member towards said driven member, to permit said clutch to slip upon predetermined overload conditions.

8. In a clutch for transmitting power, a driving member, a driven member, a releasable friction clutch for driving said driven member from said driving member, a fluid cylinder having a clutch engaging piston therein, a passageway for admitting fluid under pressure to said cylinder to move said piston in a direction to engage said clutch, a release piston mounted for movement with respect to said engaging piston and communicating with said cylinder and subject to pressure therein, a torsion member for driving said driven member from said clutch, a reaction member rotatable with said driven member, and forming a reaction member for said torsion member, and a plurality of angle pins connected between said reaction member and release piston and reacting against said release piston to hold said release piston in a retracted position with respect to said engaging piston during normal operation of said clutch and to release said release piston for movement with respect to said piston upon relative movement between said reaction member and said driving member effected by predetermined overloads on said torsion member, and valve means operable upon movement of said release piston, to relieve the pressure on said engaging piston and permit said clutch to slip.

9. In a clutch for transmitting power, a driving member, a driven member, a releasable friction clutch for driving said driven member from said driving member, a cylinder having a fluid pressure operated engaging piston for engaging said clutch, a release piston mounted within said cylinder in communication with the pressure chamber of said engaging piston, and operatively connected with said driven member so as to move with respect to said pressure chamber upon predetermined load conditions on said driven member, to increase the volume of said cylinder and reduce the pressure of fluid acting against said engaging piston, and a metering valve movable with said release piston and normally releasing fluid from said cylinder at a predetermined rate, to maintain pressure in said cylinder to apply the clutch to provide a circulation of fluid under pressure therethrough, and said metering valve with its valve casing defining a variable area orifice increasing in cross-sectional area as said release piston moves outwardly with respect to said pressure chamber, and allowing said clutch to slip upon predetermined overload conditions.

10. In a clutch for transmitting power, a driving member, a driven member, a releasable friction clutch for driving said driven member from said driving member, a cylinder having a fluid pressure operating engaging piston slidable therein, for engaging said clutch, a release piston mounted within said engaging piston and subjected to fluid pressure operating said engaging piston and operatively connected with said driven member to move outwardly from said engaging piston upon predetermined load conditions on said driven member, a fluid inlet to said cylinder, valve means controlling the passage of fluid under pressure into said cylinder through said inlet, an outlet from said cylinder a metering valve in said outlet, metering sufficient fluid from cylinder to maintain sufficient pressure in said cylinder to hold the clutch in engagement and continuously passing fluid through said cylinder during operation of the clutch, said metering valve moving with said release piston to increase the volume of fluid flowing through said outlet upon movement of said release piston outwardly from said engaging piston, to reduce the pressure of fluid acting against said engaging piston and allow said clutch to slip upon predetermined load conditions.

11. In a clutch for transmitting power, a driving member, a driven member, a releasable friction clutch for driving said driven member from said driving member, a fluid pressure cylinder, a fluid pressure operated engaging piston extensible therefrom for engaging the clutch, a release piston mounted within said engaging piston and subjected to fluid pressure from within said cylinder, and operatively connected with said driven member, to move outwardly from said engaging piston upon predetermined load conditions upon said driven member, an inlet to said cylinder, pressure regulating valve means controlling the passage of fluid under pressure through said inlet, an outlet from said cylinder having a metering valve therein operatively connected with said release piston and movable therewith, said metering valve with said fluid outlet defining a variable area orifice open for the passage of fluid from said outlet when said release piston is in a retracted position, to maintain pressure in said cylinder to operate the clutch and provide a circulation of fluid through said cylinder during operation of the clutch, and increasing in cross-sectional area as said release piston is extended from said engaging piston, whereby said clutch will slip upon predetermined load conditions.

12. In a clutch for transmitting power, a driving member, a driven member, a releasable friction slip clutch for driving said driven member from said driving member, fluid pressure operated means for engaging said clutch, release means associated with said fluid pressure operated means for reducing the torque capacity of said clutch to a predetermined torque value and subjected to the fluid under pressure operating said fluid pressure operated means, and a preloaded torsion member transmitting the load from said clutch to said driven member and measuring the torque to be transmitted by said clutch and providing movement to accommodate said release means to operate by the fluid pressure thereon, and reduce the pressure of the fluid operating said fluid pressure operated means and the torque capacity of said clutch, to allow said clutch to slip at a torque value in excess of the predetermined torque value.

13. In a clutch apparatus for transmitting power, a driving member, a driven member, a releasable friction slip clutch intermediate said members for driving the driven member from the driving member, torsion means driving said driven member from said clutch, and having an initial torsional preload applied thereto, means responsive to torque applied by the driving member to the driven member for applying a load to said torsion means in opposition to said preload to an extent dependent on the torque applied to the driven member, fluid pressure operated engaging means for engaging the clutch, fluid pressure operated release means associated with said fluid pressure operated engaging means and subjected to fluid under pressure operating said engaging means and effective to maintain the torque capacity of said clutch at a predetermined value, said torsion means being operatively associated with said fluid pressure operated release means and accommodating movement thereof by the pressure of the fluid operating said engaging means in response to the application of said opposing load in an amount determined by the value of said preload, to limit the actual torque applied to the driven member to the value of said preload and to allow said clutch to slip at higher applied torques.

LOY D. HAGENBOOK.

References Cited in the file of this patent

UNITED STATES PATENTS

| Number | Name | Date |
|---|---|---|
| 1,596,433 | Holmes | Aug. 17, 1926 |
| 2,277,554 | McCoy | Mar. 24, 1942 |
| 2,485,623 | McNairy | Oct. 25, 1949 |

FOREIGN PATENTS

| Number | Country | Date |
|---|---|---|
| 359,833 | Great Britain | Oct. 29, 1931 |